United States Patent
Yliaho et al.

(10) Patent No.: US 9,954,990 B2
(45) Date of Patent: Apr. 24, 2018

(54) PANEL SPEAKER EAR LOCATION

(71) Applicant: Nokia Corporation, Espoo (FI)

(72) Inventors: Marko Tapani Yliaho, Tampere (FI); Jarmo Antero Hiipakka, Espoo (FI)

(73) Assignee: Nokia Technologies Oy, Espoo (FI)

( * ) Notice: Subject to any disclaimer, the term of this patent is extended or adjusted under 35 U.S.C. 154(b) by 134 days.

(21) Appl. No.: 13/905,695

(22) Filed: May 30, 2013

(65) Prior Publication Data

US 2014/0357321 A1    Dec. 4, 2014

(51) Int. Cl.
| | | |
|---|---|---|
| *H04M 1/725* | (2006.01) | |
| *H04M 1/02* | (2006.01) | |
| *H04M 1/03* | (2006.01) | |
| *H04R 7/04* | (2006.01) | |

(52) U.S. Cl.
CPC ......... *H04M 1/72519* (2013.01); *H04M 1/03* (2013.01); *H04R 7/045* (2013.01); *H04M 1/0266* (2013.01); *H04M 2250/12* (2013.01); *H04R 2400/03* (2013.01); *H04R 2499/11* (2013.01)

(58) Field of Classification Search
CPC ................. H04M 1/00; H04M 1/0266; H04M 1/725191; H04M 3/00; H04M 1/72519; H04M 1/03; H04M 2250/12; H04B 1/38; H04W 88/02; H04R 7/045; H04R 2499/11; H04R 2400/03
See application file for complete search history.

(56) References Cited

U.S. PATENT DOCUMENTS

| | | | |
|---|---|---|---|
| 9,049,983 B1 * | 6/2015 | Baldwin | G06F 21/32 |
| 2002/0068537 A1 * | 6/2002 | Shim | H04M 1/605 |
| | | | 455/177.1 |
| 2006/0099996 A1 * | 5/2006 | Kanai | 455/566 |
| 2011/0086629 A1 * | 4/2011 | Simmons et al. | 455/418 |
| 2012/0058803 A1 | 3/2012 | Nicholson | 455/570 |
| 2013/0094668 A1 | 4/2013 | Poulsen | 381/107 |
| 2013/0322651 A1 | 12/2013 | Cheever | 381/101 |
| 2013/0332156 A1 | 12/2013 | Tackin | 704/226 |
| 2014/0099992 A1 * | 4/2014 | Burns et al. | 455/550.1 |
| 2014/0135058 A1 | 5/2014 | Sanchez | 455/550.1 |

FOREIGN PATENT DOCUMENTS

| | | |
|---|---|---|
| WO | WO-2012/025783 A1 | 3/2012 |
| WO | WO-2012/052803 A1 | 4/2012 |
| WO | WO-2012/090031 A1 | 7/2012 |

OTHER PUBLICATIONS

SoundLevel.pdf published Mar. 3, 2011, downloadable from website: http://web.archive.org/web/20110303024207/http://www.sengpielaudio.com/calculator-distance.htm.*

* cited by examiner

*Primary Examiner* — Amr Awad
*Assistant Examiner* — Wing Chow
(74) *Attorney, Agent, or Firm* — Harrington & Smith

(57) ABSTRACT

An apparatus including a speaker and a sensor. The speaker includes a vibrating element and a display element. The vibrating element is configured to at least partially move the display element to generate sound waves from the display element. The sensor is configured to sense when an ear of a user is placed at the speaker.

20 Claims, 13 Drawing Sheets

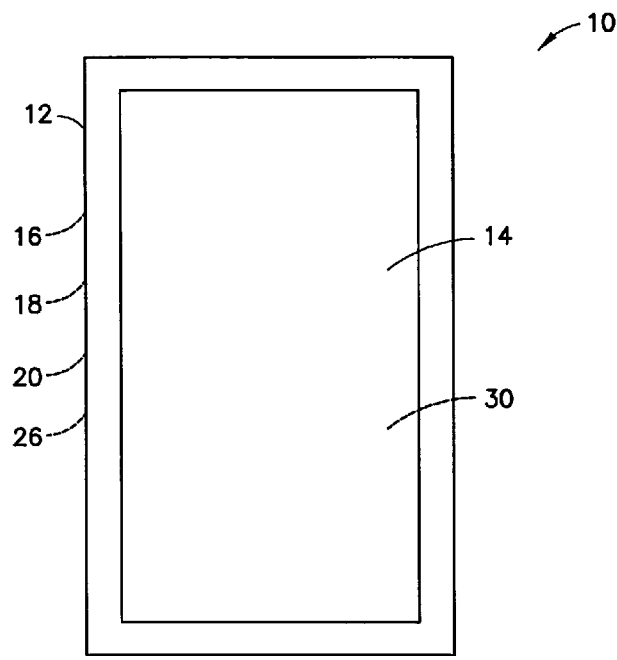
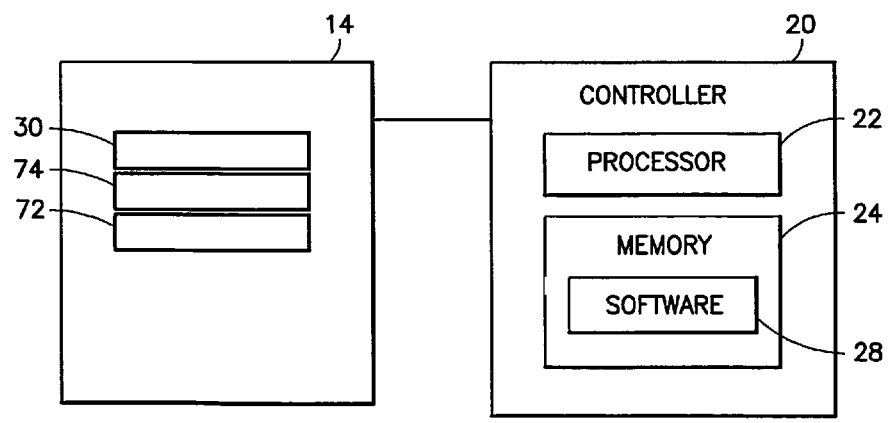
FIG.1
FIG.2

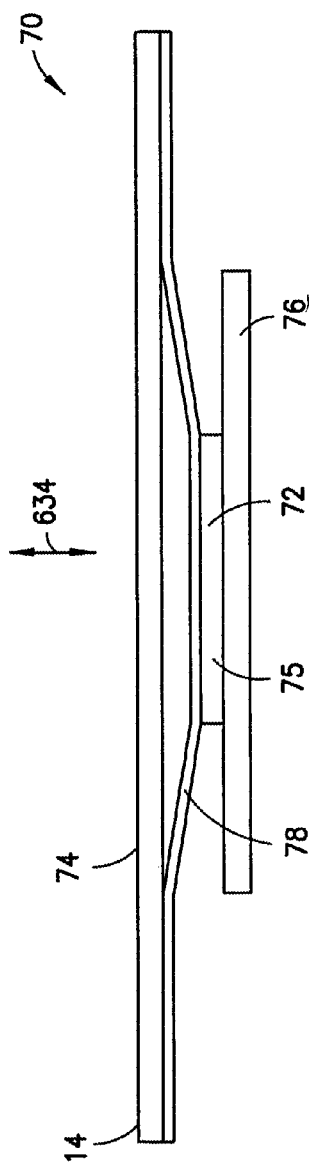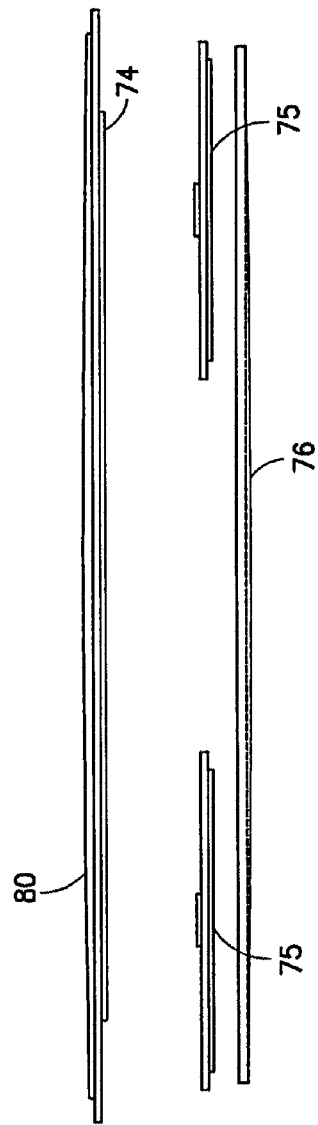

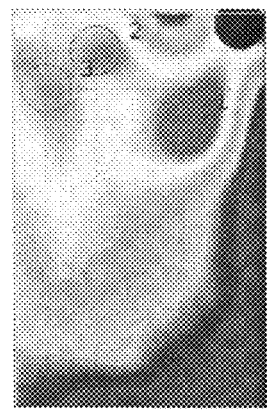 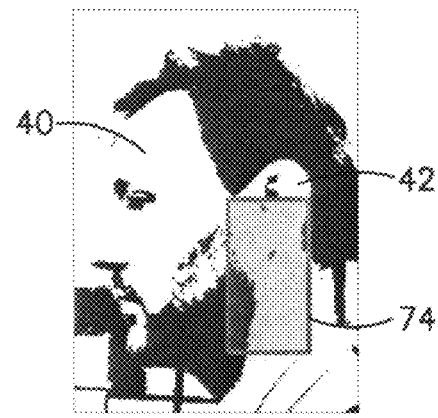
FIG.9A    FIG.9B
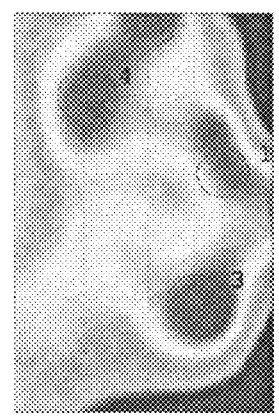 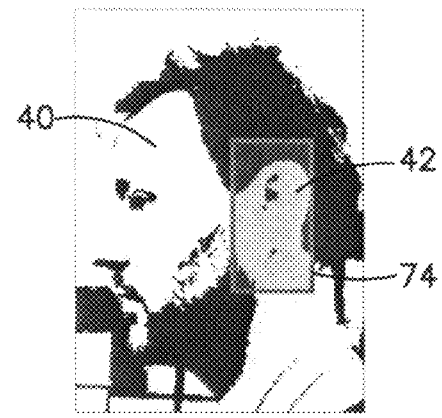
FIG.10A    FIG.10B
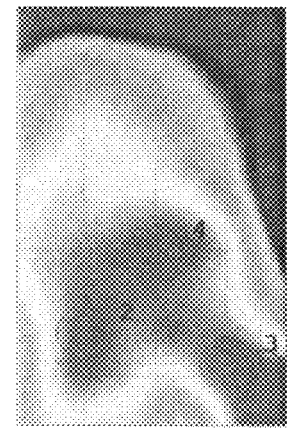 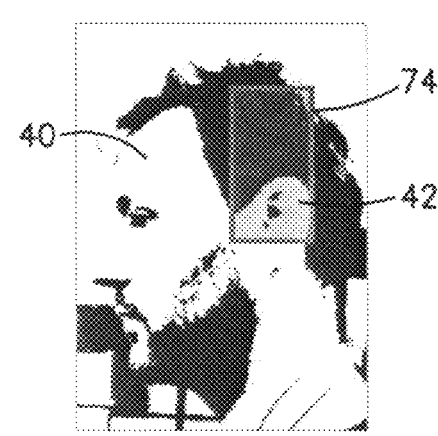
FIG.11A    FIG.11B

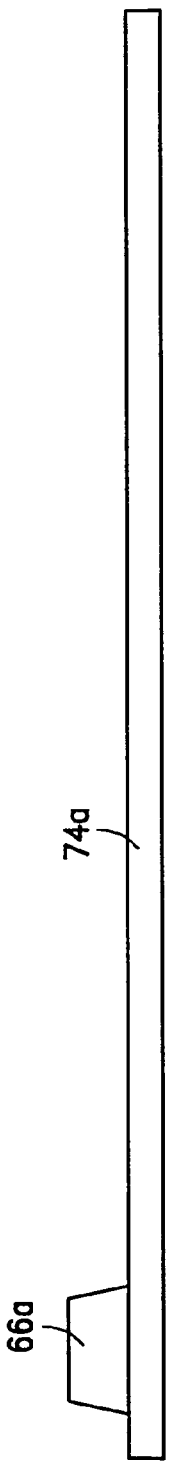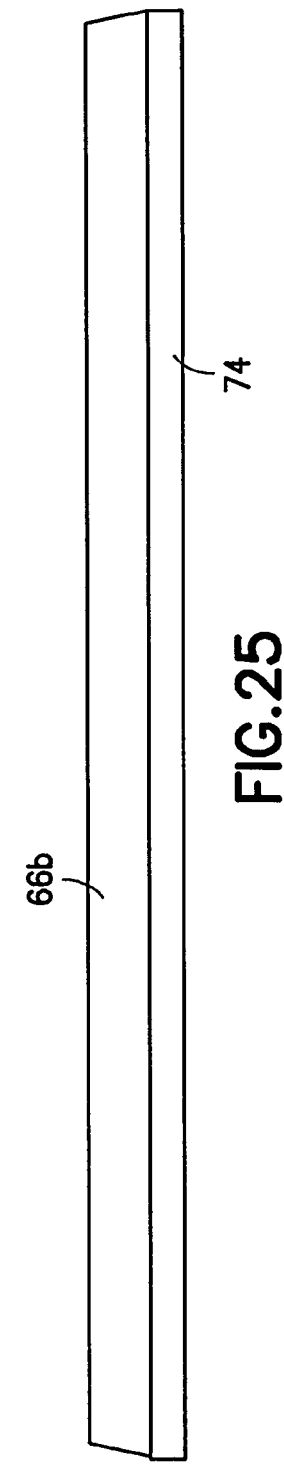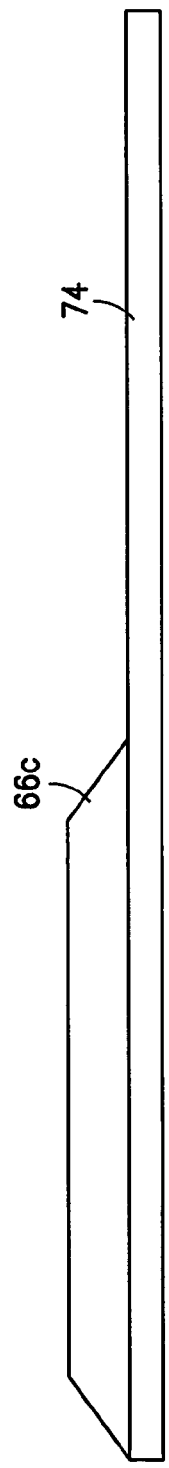

PANEL SPEAKER EAR LOCATION

BACKGROUND

Technical Field

The exemplary and non-limiting embodiments relate generally to a display panel speaker and, more particularly, to location of a user ear.

Brief Description of Prior Developments

Flat panel displays are becoming more prevalent in devices such as smart phones. Generating sound from a panel display is being investigated.

SUMMARY

The following summary is merely intended to be exemplary. The summary is not intended to limit the scope of the claims.

In accordance with one aspect, an example apparatus includes a speaker and a sensor. The speaker includes at least one vibrating element and a display element. The vibrating element is configured to at least partially move the display element to generate sound waves from the display element. The sensor is configured to sense when an ear of a user is placed at the speaker.

In accordance with another aspect, an example method comprises sensing presence of an ear of a user at a display element of a speaker of an apparatus, where the speaker comprises at least one vibrating element configured to at least partially move the display element to generate sound waves from the display element; and based upon the presence of the ear being sensed at the display element, the apparatus performing a predetermined operation.

In accordance with another aspect, an example non-transitory program storage device readable by a machine, tangibly embodying a program of instructions executable by the machine for performing operations, the operations comprising based, at least partially, upon a signal from a sensor, determining presence of an ear of a user at a display element of a speaker; and performing a predetermined function based, at least partially, upon the determined presence of the ear being sensed at the display element.

In accordance with another aspect, an example embodiment may be provided in an apparatus comprising a housing; a speaker connected to the housing, where the speaker comprises one or more vibrating element and one or more vibrated element, where the one or more vibrated element comprises an exterior housing member of the housing, where the vibrating element is configured to at least partially move the vibrated element to generate sound waves from the vibrated element; and a sensor configured to sense when an ear of a user is placed at the vibrated element.

BRIEF DESCRIPTION OF THE DRAWINGS

The foregoing aspects and other features are explained in the following description, taken in connection with the accompanying drawings, wherein:

FIG. 1 is a front view of an example embodiment of an apparatus;

FIG. 2 is a schematic diagram illustrating some of the components of the apparatus shown in FIG. 1;

FIG. 3 is a schematic sectional view of one of the audio display modules shown in FIG. 1;

FIG. 4 is a schematic exploded side view of portion of the apparatus shown in FIG. 1;

FIGS. 9A-14A and 9B-14B illustrate examples of sensor images for different locations of a user's ear, and illustrations of approximately where the apparatus would be relative to the user's ear for those sensor images;

FIGS. 24-26 illustrate different sound signal outputs along a Y-axis for three different devices;

DETAILED DESCRIPTION OF EMBODIMENTS

Figure 5:
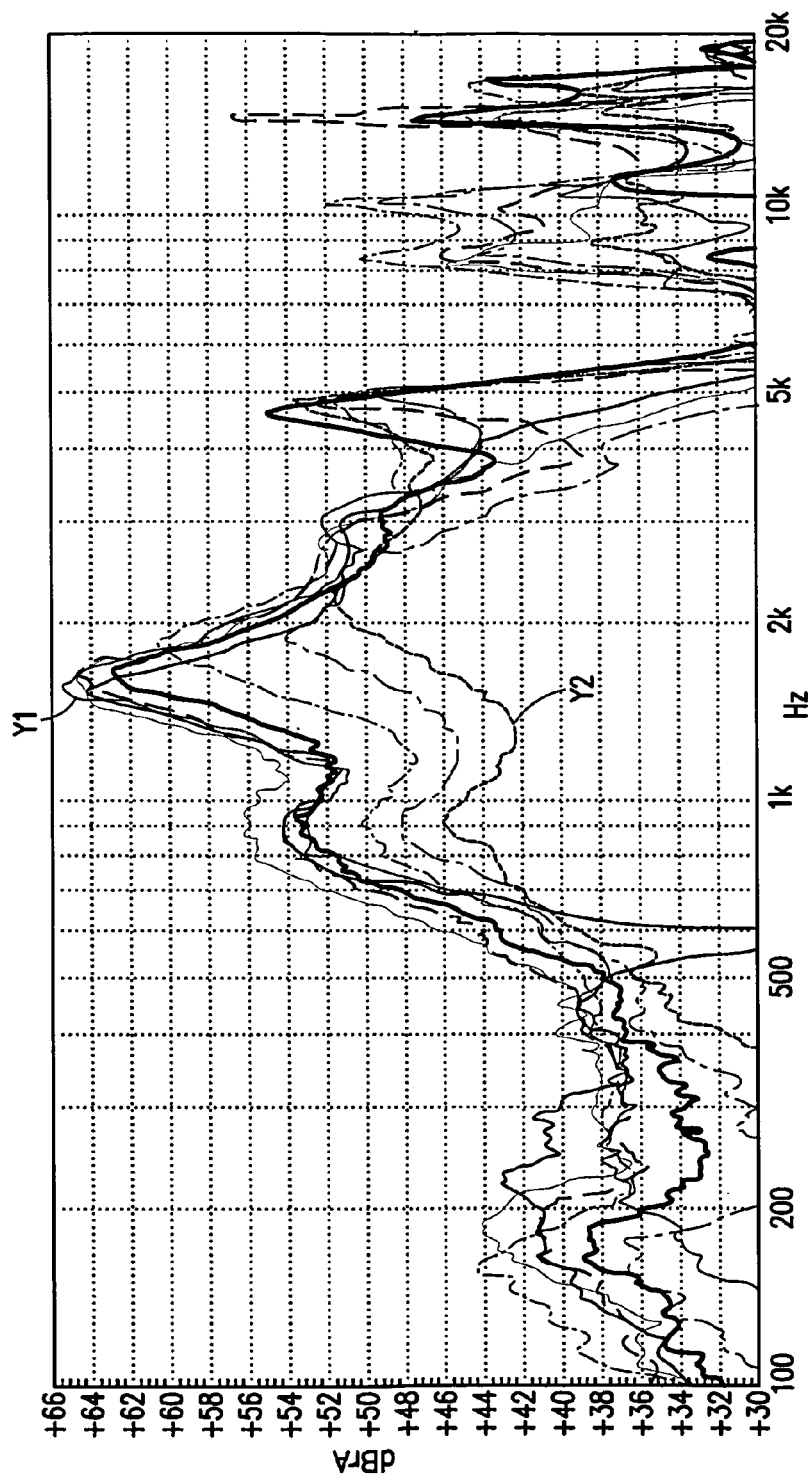
FIG. 5 is a chart illustrating performance of an audio signal at different Y-axis locations on the panel speaker shown in FIG. 1.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 is a hand-held communications device which includes a telephone application. In an alternate example the apparatus might not comprise a telephone application. In the example shown in FIG. 1, the apparatus 10 may also comprise an Internet browser application, camera application, video recorder application, music player and recorder application, email application, navigation application, gaming application, and/or any other suitable electronic device application, such as may be provided on a smartphone or tablet computer for example. Referring to both FIGS. 1 and 2, the apparatus 10, in this example embodiment, comprises a housing 12, a display module 14, a receiver 16, a transmitter 18, a rechargeable battery 26, and a controller 20 which may include at least one processor 22, at least one memory 24, and software 28. However, all of these features are not necessary to implement the features described below. For example, features as described herein may be used in a non-portable apparatus which does not have a battery.

The receiver 16 and transmitter 18 form a wireless mobile communication interface to allow the apparatus 10 to communicate with a wireless telephone system, such as a mobile telephone base station for example. The wireless mobile communication interface 16, 18 may allow the apparatus 10 to communicate such as by 4G, 4G LTE, 3G, CDMA, etc.

for example. However, in an alternate example embodiment the receiver 16 and transmitter 18 might not be provided, such as when the apparatus 10 does not have telephone capabilities. For example, the apparatus 10 might merely be a gaming device or a music/video player. However, for a device having telephone capability, cellular circuit switched telephony or VoIP may be provided for example. So, a cellular system transmitter and receiver are not necessarily needed, such as if the device has only VoIP call functionality. However, even with a device which has VoIP call functionality, the device most likely may have a transmitter and a receiver for Wi-Fi. Internet access for the apparatus 10 might be provided by a short range communications system through the television console or a wireless WLAN for example. These are only some examples, and should not be considered as limiting.

Referring also to FIG. 3, the display module 14 forms a speaker 70 comprising a vibrating element 72 and a display element 74. The display element 74, in this example, is a touch screen display which functions as both a display screen and as a user input. The display element 74 may comprise a touch input device (TID) 30, such as a capacitive sensor for example. However, features described herein may be used in a display which does not have a touch, user input feature. Alternatively, another example may comprise an apparatus which has a touchpad or touch-panel which is not part of an electronic display screen. The electronic circuitry inside the housing 12 may comprise a printed wiring board (PWB) having components such as the controller 20 thereon. The circuitry may include a sound transducer provided as a microphone.

In this example the vibrating element 72 comprises a piezoelectric member 75 connected to a printed circuit board 76. The display element 74 is an electronic display. A member 78 connects the piezoelectric member 75 to the back side of the display element 74. The piezoelectric member 75 is flexed by the printed circuit board 76. This causes the piezoelectric member 75 to move the electronic display 74 in and out as illustrated by arrow 634 to generate sound waves from the front of the electronic display 74. Referring also to FIG. 4, in this example the apparatus comprises two of the piezoelectric member 75 connected to the back side of the display element 74. The piezo actuators may be directly coupled to the display module or might not be directly coupled to the display module. The speaker in a broader definition may comprise additional element(s). For example, a speaker may have a plate under the display module where the piezos may be used to actuate the plate so that the plate could move/vibrate the display in a z-direction (634). A window plate 80 may be provided on the front face of the display element 74. In an alternate example embodiment, rather than a piezoelectric member, the vibrating element may comprise vibrating of the display with a dynamic actuator such as speaker or vibra. Thus, features as described herein are not limited to using a piezoelectric actuator.

Features as described herein may fundamentally utilize implementation of an "Audio Display" or "panel speaker" concept which has been developed by Nokia Corporation. In the Audio Display concept, generally, at least one piezo actuator may be suitably coupled to the display module for sound generation so that the display module can be used as a conventional display, but further for sound generation and perhaps tactile feedback. In alternative embodiments of Audio Display integrations, the piezo actuator may be coupled to the display window (in front of the display module) for sound generation. There are various ways of reproducing sound waves in the direction of the display module. The audio display module 14 is configured to function as a display and also function as a speaker or sound transducer.

As seen in FIG. 2, the audio display module 14 is connected to the controller 16. The controller 16 is configured to control display of images on the display element 74, and also control generation of sound from the audio display module 14. The source of the images and sounds may comprise any suitable source(s), such as applications, video, data from the Internet, television signals, etc. The audio signals sent to the audio display module 14 may be formed or controlled by the controller. The audio signals may be telephone voice signals from a telephone conversation. In this example the audio display module 14 is configured to provide an electronic display feature, an audio speaker feature and a haptic feedback feature. However, the haptic feedback feature might not be provided in an alternate embodiment.

A traditional earpiece transducer in a mobile telephone is very location sensitive. The user can hear the audio well only when the earpiece is against the ear. Features as described herein relate to earpiece audio and, more specifically, experience improvements for a case where there is no conventional earpiece transducer, but the device's display/front window may be used as a panel speaker and also as an earpiece.

Features as described herein may be used for guiding the user for optimum audio playback performance with a device having a panel speaker as an earpiece. If the front window/display works as a panel speaker, and there is no conventional earpiece transducer, then the whole display area is available to be used as an earpiece. However, with a panel speaker earpiece solution the audio performance may not be uniform throughout the display area. Audio tuning of a device in general is not a straight forwarded task. If the device does not have a specific earpiece location for the user, audio tuning becomes even more difficult since audio performance is not uniform throughout the display area. Features as described herein may be used to improve the situation with a method of guiding the user to use a certain area, or certain areas, on the front face of the display element 74 as an earpiece location and, thus, guide the user to avoid the areas where the virtual earpiece performance is not at its best. Features may be used to guide the user to move the ear close to the area of the panel earpiece where the audio performance is as its best. Performance here refers, for example, to frequency response or distortion.

Figure 6:
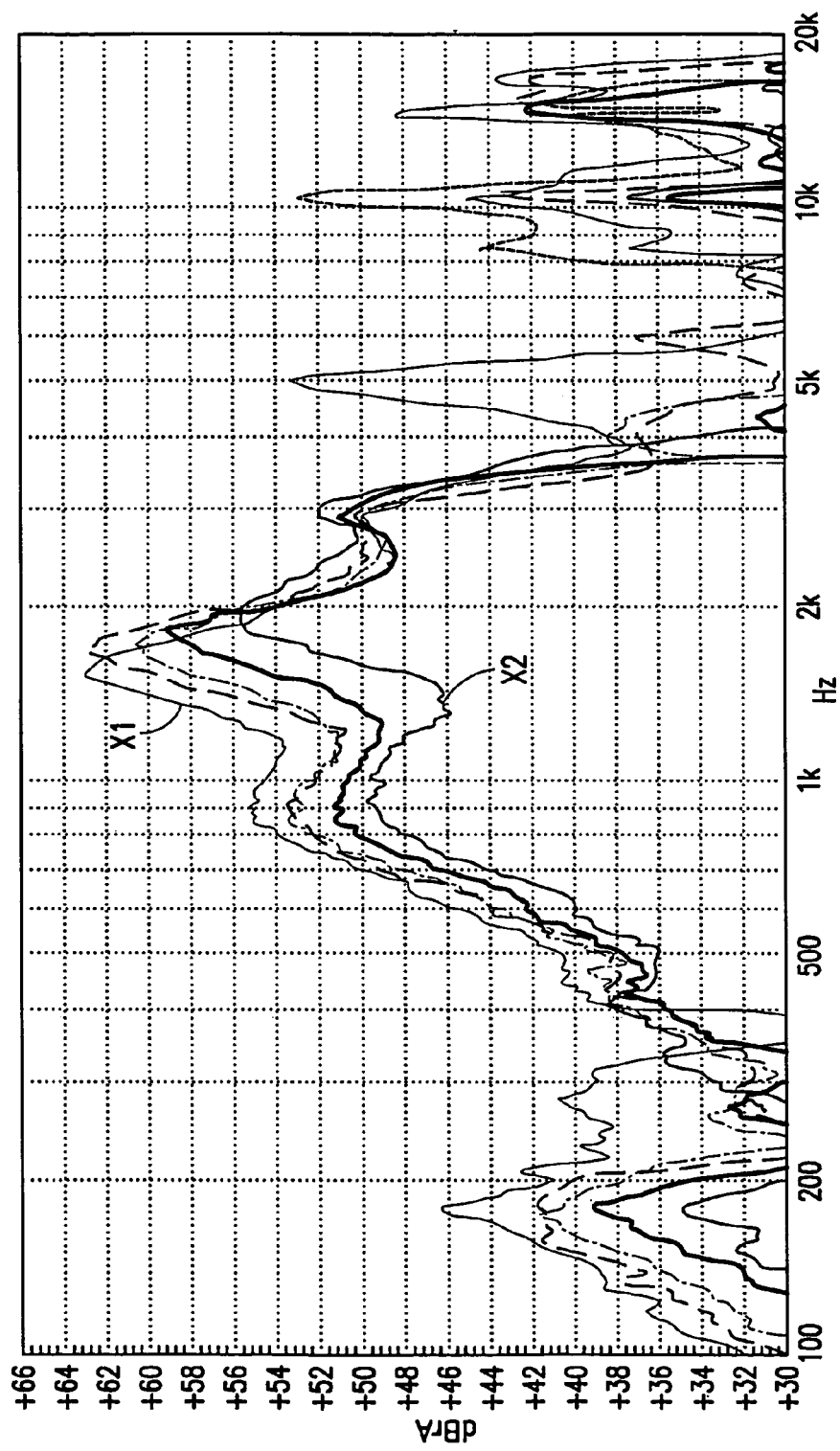
FIG. 6 is a chart illustrating performance of an audio signal at different X-axis locations on the panel speaker shown in FIG. 1.

FIG. 5 shows measurements from one type of audio display experiment. The device had two piezo actuators under the display element used to drive the display as a panel speaker. Audio performance is at its best when the ear is close to the location of the piezo actuator (s). The different curves have been measured with different distances from the top of the device, i.e., this image shows the impact of vertical movement of the ear over the display. Y location Y1 had the best performance as shown by its graph line. Y location Y2 had the worst performance as shown by its graph line. FIG. 6 shows different curves measured with different distances from the middle of the device along the x-axis, i.e., this image shows the impact of horizontal movement of the ear over the display. X location X1 had the best performance as shown by its graph line. X location X2 had the worst performance as shown by its graph line. From these two figures it can be seen that there is different audio performances at different X and Y axis coordinates of the display element 74.

When a user places his or her ear at the display element 74, the apparatus is configured to detect the ear on the display element. One type of detection may be detecting the location (such as X and Y axis coordinates) of the ear at the display element 74. After the detection has occurred, the apparatus 10 is configured to perform a predetermined operation or function. In one example the predetermined operation is to provide guidance to the user to assist the user in moving the apparatus and the ear relative to each other to a predetermined location (such as an audio sweet spot for example).

Location of the ear at the display element 74 may be accomplished using sensors. One example is to use a (high-sensitivity) touch sensor that recognizes the ear. Another example is to use force sensing and/or pressure sensing on the display element such as relative force difference between different areas of the display. The invention is not limited to using the above mentioned sensor technologies to detect the ear position. Other sensor technologies could be used. Another aspect is that the intelligibility of the audio signal could be increased in non-optimal areas. For example, if certain frequencies are not reproduced well in certain areas of the display, then different audio equalization could be used to compensate the losses. This would decrease the need for guiding the user.

Figure 8:
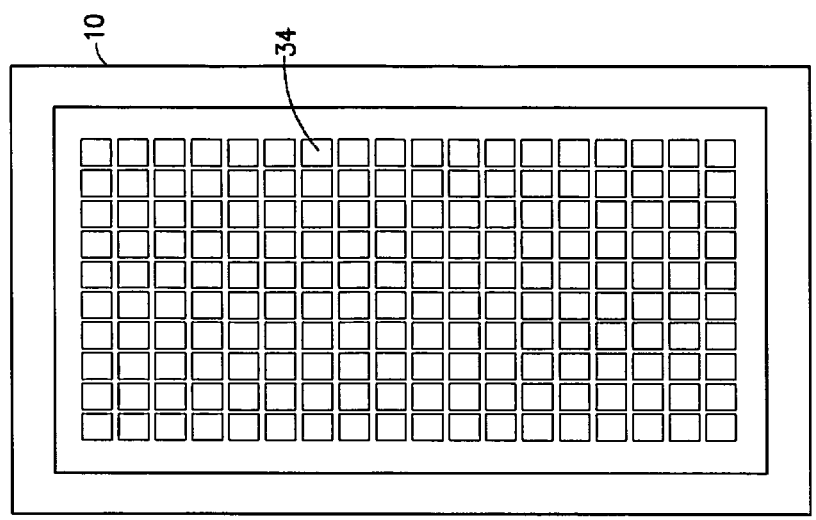
FIG. 8 is a schematic front view illustrating capacitive sensors in the apparatus for detecting a user's ear.
Figure 7:
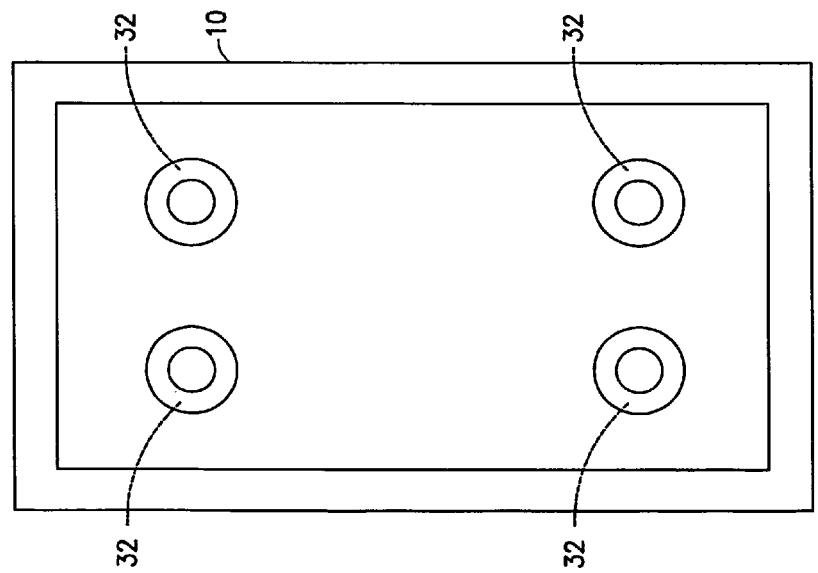
FIG. 7 is a schematic front view illustrating use of force sensors in the apparatus for detecting a user's ear.

Referring also to FIG. 7, in this example embodiment the apparatus 10 comprises force sensors 32. Referring also to FIG. 8, in this example embodiment the apparatus 10 comprises conductive sensors 34 provided as a layer on the display element 74, such as transparent electrically conductive material, Indium Thin Oxide (ITO) for example. The sensors 34 may be part of the touch input device (TID) 30 for example.

For the embodiment of FIG. 7, this may be used for detecting ear location using force sensing. Ear location can be detected to a certain accuracy using force sensing technology, such as strain gauges for example. Based on the relative values of different gauges (in the example in FIG. 7 there are four gauges under the display element), approximate ear location can be calculated. Naturally, it does not matter what touches the display, so the assumption is that during a call on the earpiece anything touching the display must be the user's ear.

For the embodiment of FIG. 8, this may be used for detecting ear location using capacitive touch sensing. Referring also to FIGS. 9-11, the images show high-sensitive touch sensor sensing of an ear 42 of a user 40 gently put over the ear at different vertical locations. FIGS. 9A, 10A and 11A are sensor images corresponding to when the position of the phone is at the bottom of a user's ear, at the middle of a user's ear, and at the top of a user's ear, respectively. FIGS. 9B, 10B and 11B generally illustrate the approximate locations of the phone relative to the user's ear for the sensor images shown in FIGS. 9A, 10A and 11A, respectively. The circles and numbers in FIGS. 9A, 10A and 11A indicate an algorithm trying to find out where the fingers (holding the apparatus 10) are over the display, and are not relevant.

If ear location placement guiding or feedback is provided, any suitable type of guiding may be provided. Guiding may be done, for example, by attenuating the audio signal when the ear is on a non-optimal area. In one type of example embodiment the guiding attenuation may be continuous so that the farther from the optimal area, the more attenuation is applied. Attenuation may also be made frequency-dependent, such as by attenuating higher frequencies more than lower frequencies for example. Attenuating the audio signal is just an example of the technologies that can be used to guide the user. It is possible to notify or guide the user in other ways, such as by using haptic feedback when the ear is on top of a non-optimal location for example. The haptic feedback may be provided by one of the piezoelectric members 75 for example.

Figure 12A:
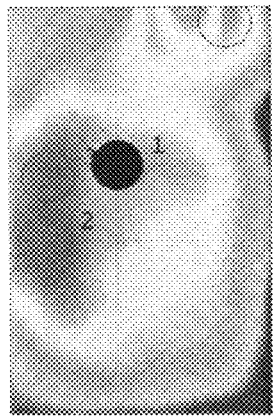
Figure 12B:
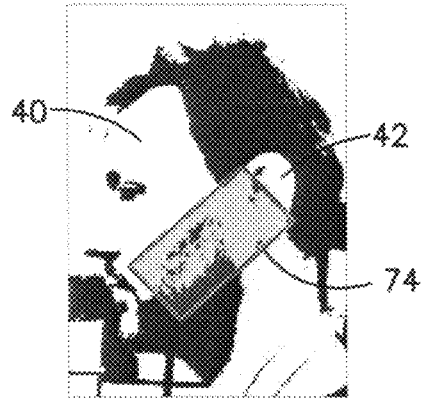
Figure 13A:
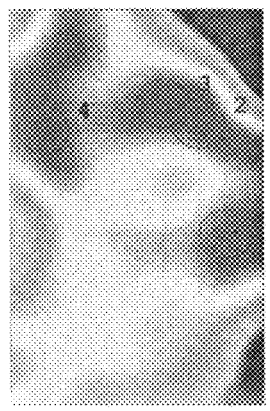
Figure 13B:
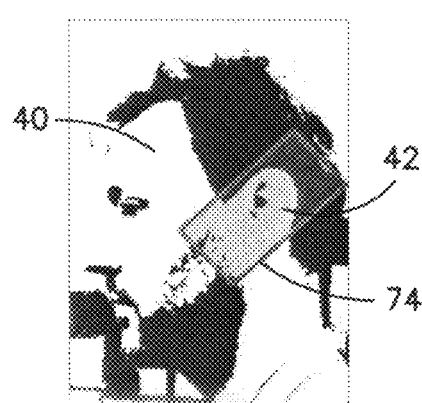
Figure 14A:
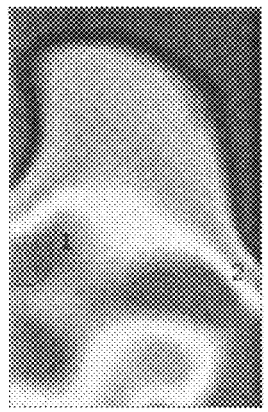
Figure 14B:
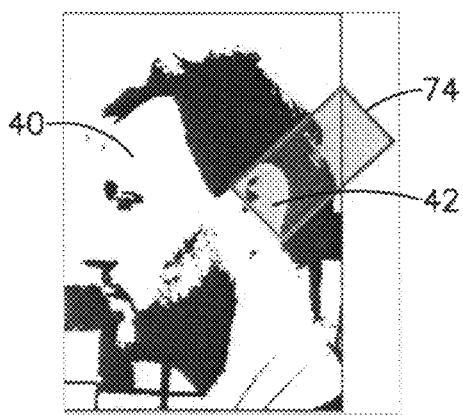

FIGS. 12-14 show images similar to FIGS. 9-11 of high-sensitive touch sensor sensing of an ear gently put over the ear at an angle of about 45 degrees relative to vertical. In FIGS. 12A and 12B, the ear is on the top of the display element 14, in FIGS. 13A and 13B in the middle and in FIGS. 14A and 14B on the bottom. The circles and numbers indicate the algorithm trying to find out where the fingers are over the display, and are not relevant.

Figure 15A:
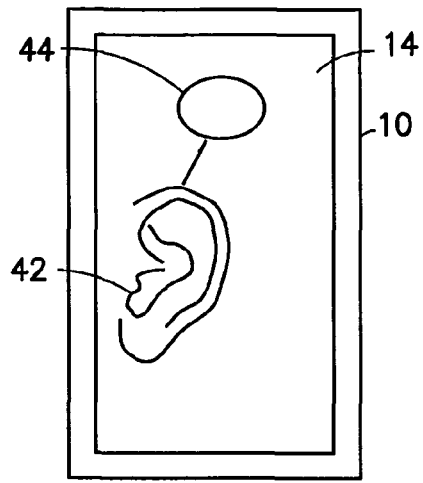
FIGS. 15A-15B illustrate how guidance may be used to guide a user to move his or her ear to a predetermined location or sweet spot.
Figure 15B:
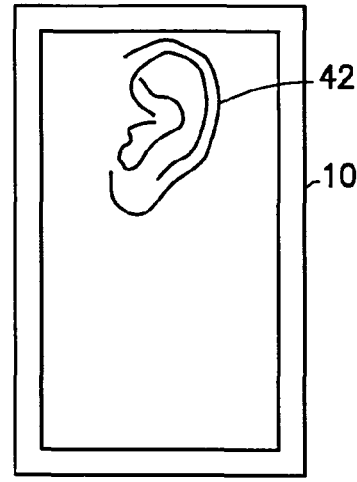
Figure 16A:
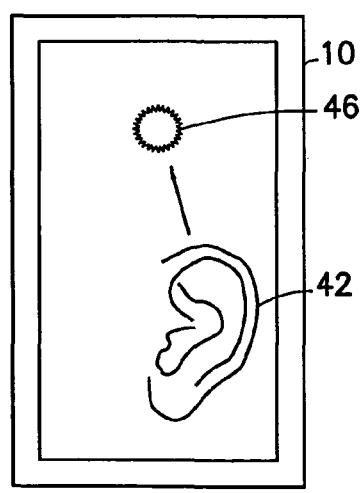
FIGS. 16A-16B illustrate another example of how guidance may be used to guide a user to move his or her ear to a predetermined location or sweet spot.
Figure 16B:
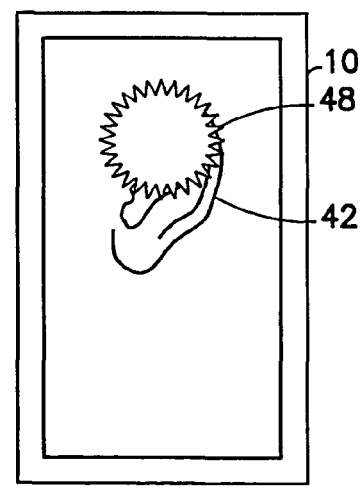

Referring also to FIGS. 15A-15B, FIG. 15A shows the ear 42 at the display element of the display module 14. A predetermined location 44 has been determined to have the best audio performance. Thus, the apparatus may be configured to provide guidance to the user to move the ear 42 and apparatus 10 relative to each other such that the ear 42 is relocated over the predetermined location as illustrated by FIG. 15B. The guidance may be haptic vibration of the display module 14 on the ear while the ear is at the non-predetermined location shown in FIG. 15A until the ear is moved to the predetermined location as shown in FIG. 15B. This is only an example. Referring also to FIGS. 16A and 16B, another example may comprise providing the attenuated audio signal 46 when the ear 42 is not located at the predetermined position. When the ear is located at the predetermined position, the audio signal 48 is not attenuated as illustrated by FIG. 16B.

In one example embodiment the ear position relative to the display element 74 can be quite well detected using the touch sensor 30. The controller 20 may be provided with an algorithm used by the processor 22 that calculates the ear position. Alternatively, or additionally, the algorithm may be part of the touch sensor subsystem that does all the math and only indicates the location of, for example, the ear hole. The FIG. 9B-14B images are not even done using the latest technology available, and the newer touch sensors are even more sensitive and accurate.

Figure 17:
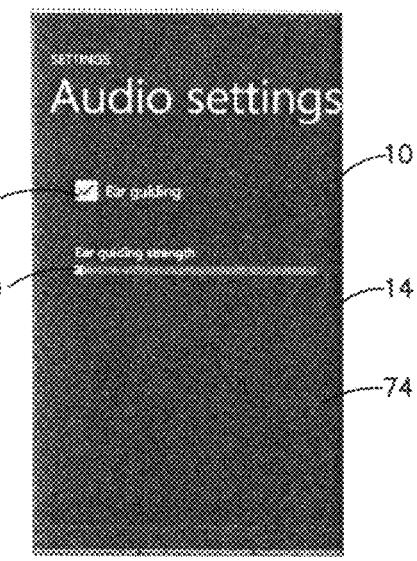
FIG. 17 is an example of a user interface to allow a user to select user selectable setting of an ear guidance system.

Referring also to FIG. 17, an example of an image displayed on the display element 74 is shown to allow for User settings of the apparatus 10 related to the ear location guiding system. By default, having the ear guiding system ON may be provided as an automatic feature. However, the user may be given an option to switch it OFF and/or adjust the strength of the feedback (such as haptic feedback for example) as illustrated by the user selectable settings 48 and 50 shown in FIG. 17. The strength adjustment 50 may mean that the stronger the setting, the smaller the sweet spot, and/or the more aggressive the attenuation around the sweet spot for example. By default also the strength setting may be part of the device manufacturer's audio tuning.

Figure 18:
FIGS. 18-20 illustrate examples of user interface images to guide a user to a predetermined location or sweet spot which may be used in addition to non-visual user guidance.
Figure 19:
Figure 20:

Referring also to FIGS. 18-20, examples of images, on the user interface (UI) at the display element 74, are shown when the apparatus 10 is receiving an incoming call. These three example views show how the UI could indicate to the user where the ear should be placed (where the predetermined location for the best audio signal performance is located). In these three examples the predetermined location is symbolized by the images 52a, 52b and 52c, respectively. The same images 52a, 52b, 52c may be used during dialing an outgoing call and/or during a telephone call for example.

Figure 23:
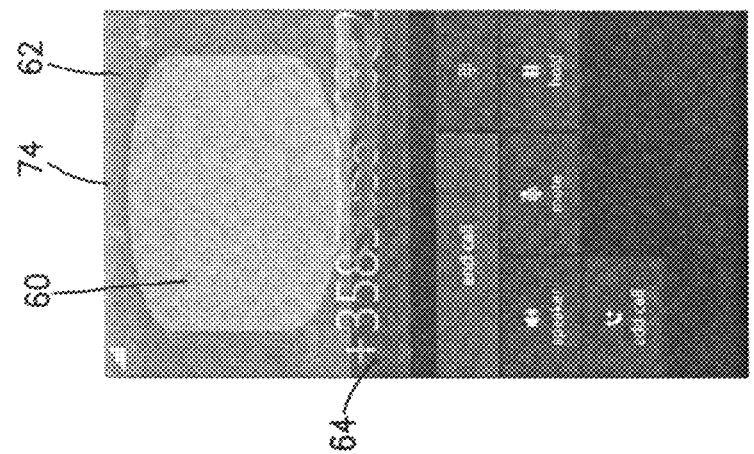
FIGS. 21-23 illustrate examples of how different areas of a user interface may have different audio signal attenuations.
Figure 22:
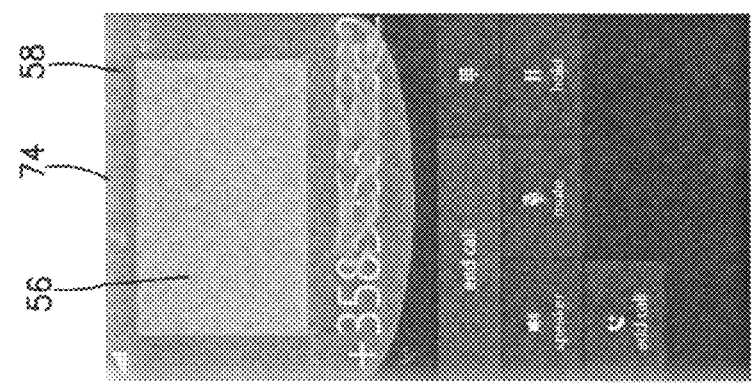
Figure 21:
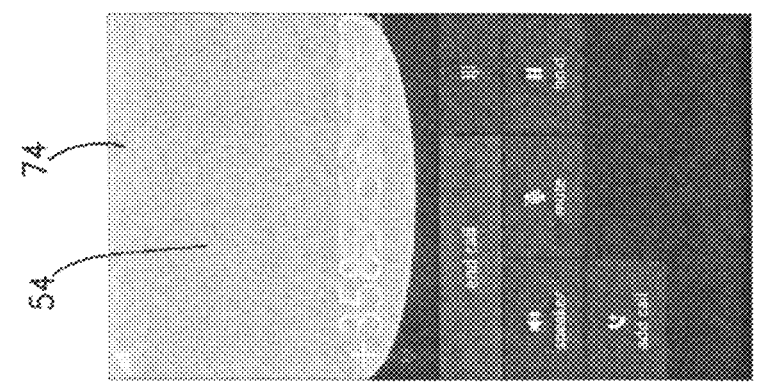

Referring also to FIGS. 21-23, ear position mapping to audio processing will be discussed. FIG. 21 shows an example how volume control can guide a user to the best possible area. The area 54 marked on top of the UI shows the "good quality" area. If the ear canal is recognized to be on top of that area, downlink audio may play normally. If the ear canal is outside that area 54, then downlink may be muted for example. FIG. 22 shows another example how volume control can guide to the best possible area. The area 56 marked on top of the UI shows the "good quality" area. If the ear canal is on top of the area 56, then audio plays normally. If the ear canal is in dim area 58, then downlink audio may play with half the volume for example (or volume adjusts gradually between nominal and zero volume depending on the ear canal distance from the area 56). If the ear canal is outside the areas 56, 58, then downlink may be muted.

FIG. 23 shows another example how volume control can guide to the best possible area. The area 60 marked on top of the UI shows the "good quality" area. If the ear canal is on top of the area 60, then audio plays normally. If the ear canal is in dim area 62, then downlink audio plays with half the volume (or volume adjusts gradually between nominal and zero volume depending on the ear canal distance from the dark yellow area). If the ear canal is on top of the area 64, then the device gives haptic feedback in order to warn the user from getting out from the good area. If the ear canal is outside the areas 60-64, then downlink may be muted.

The idea of a panel speaker is to make a telephony use case easier to the end user. The traditional earpieces are very location sensitive. A conventional panel speaker does not have significant location sensitivity. The mechanism described herein is something in-between, and provides guiding the user to use an area of a panel speaker (that could be for example the upper half of the display) where the audio quality is good or the best. This may provide guiding of the user to avoid an area (that could be for example the lower half of the display) that should not, for one reason or another, be used as an earpiece region of the panel speaker.

FIGS. 24-26 show the audio signal location sensitivity in device y-axis. FIG. 24 corresponds to a traditional earpiece that works only in a small area at the top of the device. 74*a* is the display component seen from the device side and 66*a* symbolizes the approximate audio output level if the ear is on that location on the display. FIG. 25 illustrates an uncontrolled panel speaker that works on the whole display (although the quality may not be good everywhere). 74 is the display component seen from the device side and 66*b* symbolizes the approximate audio output level if the ear is on that location on the display. FIG. 26 illustrates the display component 74 where the speaker is controlled (as described above) such that the panel speaker works in an area 66*c* that is specifically defined. Also, the level outside the sweetspot is not so abrupt, but can gradually fade out depending on the distance from the sweetspot. With the apparatus 10, a traditional earpiece transducer in not provided and, software may be used to reduce the area which sound comes from on the display element 74 based upon ear location sensed on the display element 74.

Figure 27:
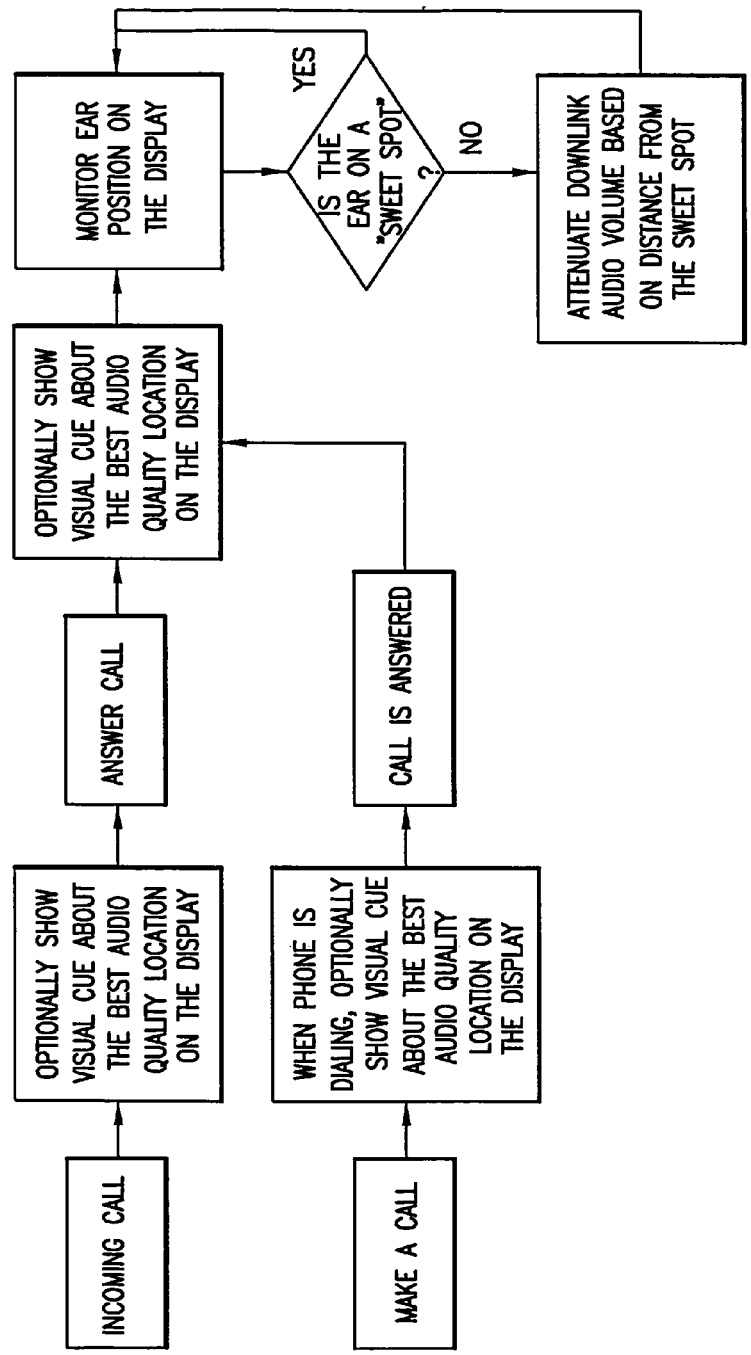
FIG. 27 is a flow diagram of one example method.

FIG. 27 is a flowchart that describes what is shown in the UI and when the attenuation (or other processing depending on the ear location on the display) may occur. Showing the visual cue about the best audio quality sweet spot is optional and can occur also when a call is being received or established; not only during the call.

An example embodiment may be provided in an apparatus comprising a speaker comprising a one or more vibrating element and a display element, where the vibrating element is configured to at least partially move the display element to generate sound waves from the display element; and an ear a sensor configured to sense when an ear of a user object is placed at the speaker.

The object, such as an ear for example, can be detected without any physically touching in some example embodiments. For example, capacitive sensing (hover touch) could be utilized. It is also possible to have a sensor which may detect the object when the object is located at the speaker (in close proximity to the speaker), but not necessarily touching the speaker.

An example embodiment may be provided in an apparatus comprising a speaker comprising a vibrating element and a display element, where the vibrating element is configured to at least partially move the display element to generate sound waves from the display element; and a sensor configured to sense when an ear of a user is placed at the speaker.

The example described above is based on a tactile audio display, but other similar technologies could be used as well. For example, a linear vibrator or a bone conduction transducer could move the display window in front of the display. A "display element" may mean such an electronic display itself and/or the display window in front of the electronic display.

The ear sensor may be configured to sense a location of the ear relative to the display element. The apparatus may be configured to be adjusted by the user to change a size of a predetermined location on the display element and/or change an attenuation of an audio signal from the speaker when the ear is not located at the predetermined location. The apparatus may further comprise an ear placement guide configured to provide user feedback between the speaker and the ear of the user to help the user to place the ear in a predetermined location at the display element. The apparatus may further comprise a controller connected to the display element to present a visual image on the display element of the predetermined location to help the user to place the ear at the predetermined location on the display element. The ear placement guide may be configured to be adjusted by the user through a user input of the apparatus comprising the display element. The ear placement guide may be configured to provide the user feedback by attenuating an audio signal when the ear is not located at the predetermined location. The ear placement guide may be configured to attenuate the audio signal different amounts based upon a distance between the ear and the predetermined location. The ear placement guide may be configured to attenuate at least one frequency differently from another frequency. The ear placement guide may be configured to attenuate the audio signal different amounts based upon at least two different locations on the display element away from the predetermined location. The sensor may comprise a touch sensor at the display element. The sensor may comprise a force sensor and/or a pressure sensor at the display element. The apparatus may further comprise a controller configured to perform a predetermined operation based upon a signal from the sensor. The apparatus may be configured to perform at least one of the following as the predetermined operation: provide haptic feedback to the ear of the user on the display element, provide different audio equalization based upon location of the ear on the display element. The apparatus may comprise a telephone application, a transmitter and a receiver.

An example method may comprise sensing presence of an ear of a user at a display element of a speaker of an apparatus, where the speaker comprises a vibrating element configured to at least partially move the display element to generate sound waves from the display element; and based upon the presence of the ear being sensed at the display element, the apparatus performing a predetermined operation.

Sensing presence of the ear may comprise sensing location of the ear relative to the display element of the speaker. The predetermined operation may comprise providing feedback at the speaker to the ear to help the user to place the ear in a predetermined location at the display element. The predetermined operation may comprise providing different audio equalization based upon location of the ear on the display element.

An example embodiment may be provided in a non-transitory program storage device readable by a machine, such as memory 24 for example, tangibly embodying a program of instructions executable by the machine for performing operations, the operations comprising based, at least partially, upon a signal from a sensor, determining presence of an ear of a user at a display element of a speaker; and performing a predetermined function based, at least partially, upon the determined presence of the ear being sensed at the display element.

An example embodiment may be provided in an apparatus comprising a housing; a speaker connected to the housing, where the speaker comprises one or more vibrating element and one or more vibrated element, where the one or more vibrated element comprises an exterior housing member of the housing, where the vibrating element is configured to at least partially move the vibrated element to generate sound waves from the vibrated element; and a sensor configured to sense when an ear of a user is placed at the vibrated element.

In various locations above equalization is used as an example of one type of feature which may be adjusted based on the ear location. However, features as described herein are not limited to merely adjusting equalization. For example, dynamic range compression and noise suppression are also algorithms which may be adjusted or changed based upon knowing the ear location. These are only examples. Other applications may also use the ear location/position determination as in input for their respective applications.

Figure 28:
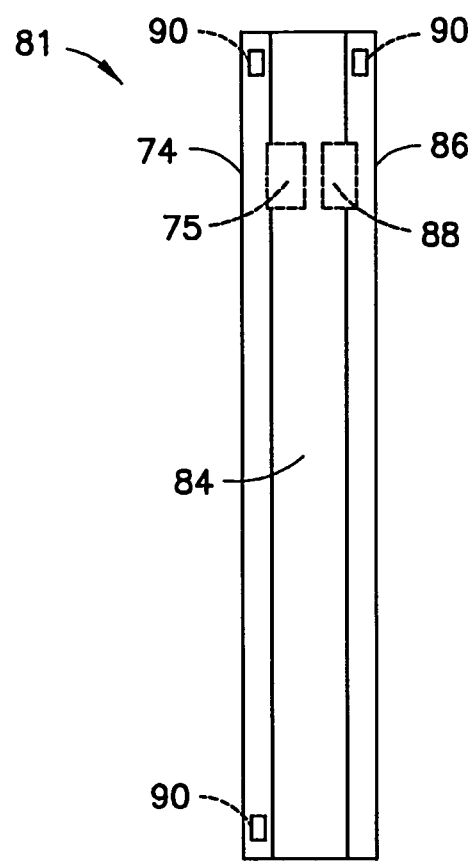
FIG. 28 is a schematic side view of an alternate example embodiment.

The examples discussed above in the drawings relate to ear location/position relative to an electronic display. However, features as described herein are not limited to use with a display. Referring also to FIG. 28, if the display 74 is vibrated, a side-effect is that the whole device may vibrate including the back cover 86. If a force is applied to the display stack, approximately the same force (just in an opposite direction) is applied to the chassis/body. Since the chassis is typically heavier than the display stack, its vibration is less sensitive and, thus, the earpiece functionality performance is not so good in the chassis than in the display stack, but is still usable. In an alternate example embodiment, the chassis or a portion of the chassis may be designed to provide an enhanced or enlarged vibration capability. Thus, the back-cover 86 can also be used as an earpiece. The back-cover may work as an earpiece even if the actuator 72 is at the display element 74 at the front side. In other words, even if we vibrate the display stack, the whole body may become "a vibrated element".

As a side effect of vibrating the device, it will also emit audio. Thus, the ear detection may be in the rear cover. In this example embodiment a touch sensor may be provided at or in the back cover 86. This example is illustrated in FIG. 28 where the apparatus 81 comprises a display 74 on a front side, a main body 84 having electronics therein, a back side 86 of the housing, and a vibrating element 88. The vibrating element 88 is configured to vibrate the back side 86 to cause sound to emanate from the back side 86. The user can place his/her ear against the back side 86, and the back side functions similar to a panel speaker, but as an earpiece for the user's ear. The apparatus 81 does not have a speaker behind the back side 86 of the housing with holes through the back side for the sound to travel through. Instead, the back side 81 is part of the speaker. The back side 81 is a vibrated element which is vibrated by the vibrating element 88 to transmit sound from the speaker, such as a voice acoustic signal from a telephone call for example. In an alternate example the apparatus may have an additional speaker behind the back side 86 of the housing with holes through the back side for additional sound to travel through. It should be noted that the vibrating element 88 need not be provided for the back cover 86 to be the vibrated element of an earpiece speaker; this is still possible with merely the vibrating element 75.

In one example embodiment, having a display is not actually necessary. For example, in one type of example embodiment features may be used without using the display or a device which does not actually have a display. One example is the back cover of the apparatus 10.

It is possible to use the above described functionality so that there is ear detection, but not necessarily ear detection at the display, such as a touch sensor at the back cover for example. As another example an alternative or additional sensor might be one or more cameras 90. One or more front cameras can be used for this purpose. The camera sensor(s) could be used alone or in conjunction with the display sensor(s) to sense the location of the apparatus 10 relative to the user's ear and/or other portion of the user's head. If the front camera(s) is in the bottom part of the device (instead of the top part where it typically is), the front camera or multiple front cameras could be used to detect a distance or proximity of the ear or other portion of the user's head, relative to the speaker.

An example apparatus may comprise at least one processor, and at least one memory having software, where the processor, the memory and the software are configured to perform a predetermined operation based, at least partially, upon presence of an ear of a user being sensed at a housing member of the apparatus, such as at a display element of the apparatus.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:
1. An apparatus comprising:
a speaker comprising one or more vibrating element and a display element, where the vibrating element is configured to at least partially move the display element to generate sound waves from the display element;
a sensor configured to sense when an ear of a user is placed at the speaker, where the sensor is configured to sense a location of the ear at the display element;
at least one processor; and
at least one non-transitory memory storing software;

wherein the at least one memory and the software configured to, with the at least one processor, cause the apparatus at least to:

attenuate, when the location of the ear of the user is not located at a predetermined location of the display area, at least one frequency of an audio signal to provide user feedback between the speaker and the ear of the user to guide the user to place the ear in the predetermined location at the display element, wherein the feedback comprises sound waves generated by the speaker according to the attenuated audio signal, wherein attenuation of the at least one frequency of the audio signal comprises at least one of: attenuating the at least one frequency differently from another frequency of the audio signal; and attenuating only some of the frequencies of the audio signal.

2. An apparatus as in claim 1, where the apparatus is configured to be adjusted by the user to change a size of the predetermined location on the display element.

3. An apparatus as in claim 1, wherein the at least one memory and the software are configured to, with the at least one processor, cause the apparatus at least to:
present a visual image on the display element of the predetermined location to help the user to place the ear at the predetermined location on the display element.

4. An apparatus as in claim 1, wherein the feedback is adjustable by the user through a user input of the apparatus comprising the display element.

5. An apparatus as in claim 1 wherein attenuation of the audio signal is based upon a distance between the ear and the predetermined location and comprises:
attenuating the at least one frequency different amounts from another frequency, and
attenuating the audio signal different amounts based upon at least two different locations on the display element away from the predetermined location.

6. An apparatus as in claim 1, where the sensor comprises at least one of:
a touch sensor at the display element,
a force sensor at the display element.

7. An apparatus as in claim 1, wherein the at least one memory and the software are configured to, with the at least one processor, cause the apparatus at least to perform a predetermined operation based upon the signal from the sensor.

8. An apparatus as in claim 7, wherein the apparatus is configured to perform the predetermined operation, wherein different audio equalization is provided based upon location of the ear on the display element.

9. An apparatus as in claim 7, wherein the apparatus is configured to provide haptic feedback to the ear of the user on the display element as the predetermined operation.

10. An apparatus as in claim 1, wherein the apparatus comprises at least one printed wiring board including a transmitter and a receiver, where the software comprises a telephone application.

11. An apparatus as in claim 1, where the one or more vibrating element is configured to vibrate an exterior housing member of the housing to generate sound waves.

12. An apparatus as in claim 1, where the speaker comprises one or more housing member of the apparatus, where the vibrating element is configured to at least partially move the one or more housing member to generate sound waves from the one or more housing member, where the one or more housing member substantially provides a display area.

13. An apparatus as in claim 12, where the one or more housing member comprises at least one of an electronic display and a display window.

14. An apparatus as in claim 1, wherein sensing location of the ear at the display element of the speaker is based at least on a shape of at least part of the ear.

15. An apparatus as in claim 1, wherein the apparatus is configured to
determine, at least partially upon a signal from the sensor, presence of the ear of the user at a display area of the speaker, wherein attenuation of the at least one frequency of the audio signal is performed in response to the determination of the presence of the ear of the user at the display area of the speaker.

16. A method comprising:

sensing presence of an ear of a user at a display element of a speaker of an apparatus, where the speaker comprises one or more vibrating element configured to at least partially move the display element to generate sound waves from the display element, where sensing presence of the ear comprises sensing location of the ear at the display element of the speaker; and in response to sensing presence of the ear at the display element, causing the apparatus to perform a predetermined operation, where the predetermined operation comprises: when the location of the ear of the user is not in a predetermined location at the display element, attenuating, using a processor of the apparatus, at least one frequency of an audio signal to provide feedback at the speaker to the ear to guide the user to place the ear in the predetermined location at the display element wherein the feedback comprises sound waves generated by the speaker according to the attenuated at least one frequency of the audio signal, wherein attenuating the at least one frequency of the audio signal comprises at least one of: attenuating the at least one frequency differently from another frequency of the audio signal; and attenuating only some of the frequencies of the audio signal.

17. A method as in claim 16, where the predetermined operation comprises providing different audio equalization based upon location of the ear on the display element.

18. A method as in claim 16, adjusting a size of the predetermined location on the display element based on a user input.

19. A method as in claim 16, presenting a visual image on the display element of the predetermined location to help the user to place the ear at the predetermined location on the display element.

20. A method as in claim 16, wherein sensing location of the ear at the display element of the speaker is based at least on a shape of at least part of the ear.

* * * * *